United States Patent [19]

Pickering et al.

[11] Patent Number: 5,495,946
[45] Date of Patent: Mar. 5, 1996

[54] WICKETLESS SADDLE PACK OF PLASTIC BAGS

[75] Inventors: Gordon F. Pickering, Lyons; Bruce R. Wilkes, Mendon, both of N.Y.

[73] Assignee: Huntsman Packaging Corp., Macedon, N.Y.

[21] Appl. No.: 358,736

[22] Filed: Dec. 19, 1994

Related U.S. Application Data

[63] Continuation-in-part of Ser. No. 235,499, Apr. 29, 1994.

[51] Int. Cl.$^6$ ..................................................... B65D 33/14
[52] U.S. Cl. ................... 206/554; 383/9; 383/37
[58] Field of Search ................... 206/554; 383/8, 383/9, 37; 493/210, 379; 53/413

[56] References Cited

U.S. PATENT DOCUMENTS

| | | | |
|---|---|---|---|
| 3,021,947 | 2/1962 | Sylvester et al. | 206/554 |
| 4,106,734 | 8/1978 | Walitalo . | |
| 4,165,832 | 8/1979 | Kuklies et al. . | |
| 4,305,503 | 12/1981 | Membrino | 206/554 |
| 4,458,466 | 7/1984 | Carbone et al. | 383/37 X |
| 4,493,419 | 1/1985 | Prader et al. . | |
| 4,557,384 | 12/1985 | Membrino . | |
| 4,699,607 | 10/1987 | Lambrecht | 206/554 X |
| 4,733,780 | 3/1988 | Jensen | 206/554 |
| 4,769,126 | 9/1988 | Roen et al. | 206/554 |
| 4,769,175 | 9/1988 | Roen et al. | 206/554 |
| 4,785,938 | 11/1988 | Benoit, Jr. et al. . | |
| 4,796,759 | 1/1989 | Schisler . | |
| 4,989,732 | 2/1991 | Smith . | |
| 5,100,000 | 3/1992 | Huseman | 206/554 |

FOREIGN PATENT DOCUMENTS

| | | | |
|---|---|---|---|
| 1958690 | 5/1971 | Germany | 206/554 |

*Primary Examiner*—Bryon P. Gehman
*Attorney, Agent, or Firm*—Harris Beach & Wilcox

[57] ABSTRACT

A wicketless saddle pack of thermoplastic bags includes a first and second stack of a number of individual thermoplastic bags oppositely opposed over a common welded pad segment. Each of the bags has a bottom edge, upper and lower walls, a pair of side edges, and an open top end. A lip segment is provided adjacent the open end of each individual bag. The lip portion is an extension of the material forming the lower wall of a respective bag and includes at least one locating hole. A perforated tear line is formed between the open end of the bag and the lip portion. The lip segments of the two stacks are bonded together with ultrasonic vibratory energy to form the welded pad of lips. The welded pad is formed by moving at least one shaped ultrasonic horn downward through the stack of consecutive lips while activating the shaped horn with ultrasonic vibratory energy to from a continuous tapered weld through the stack of lip portions.

5 Claims, 6 Drawing Sheets

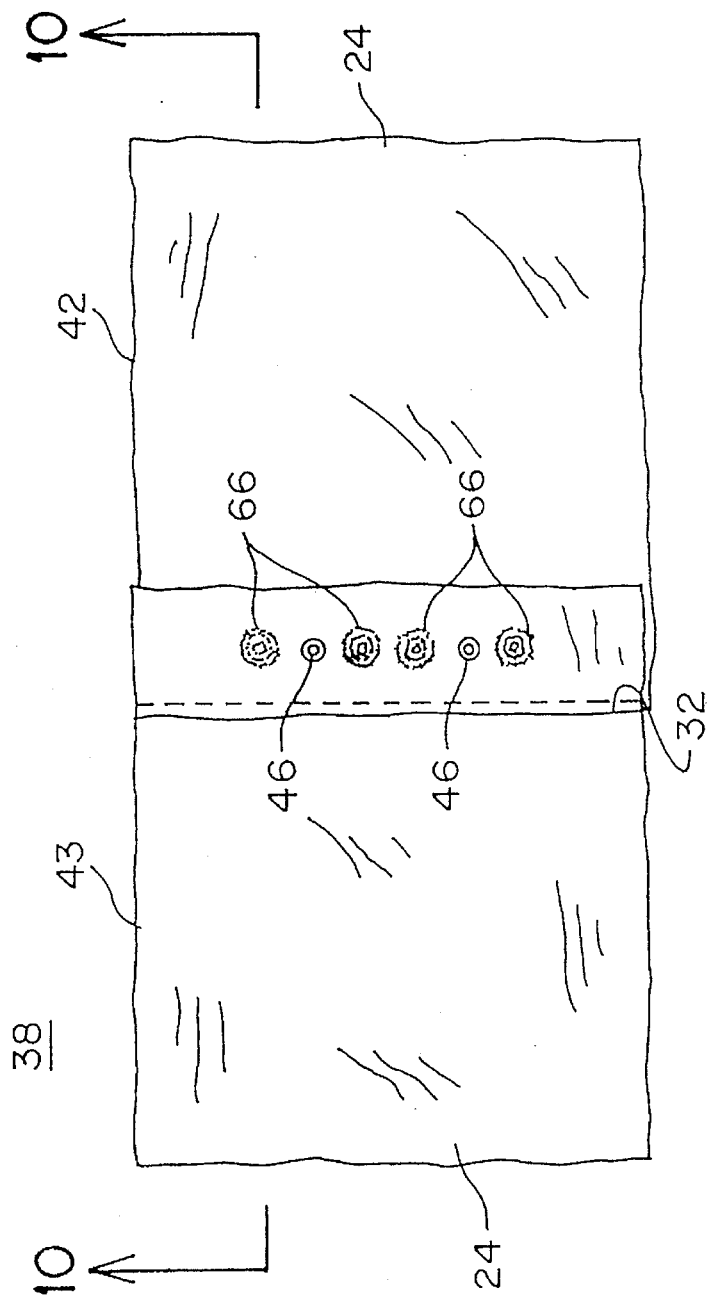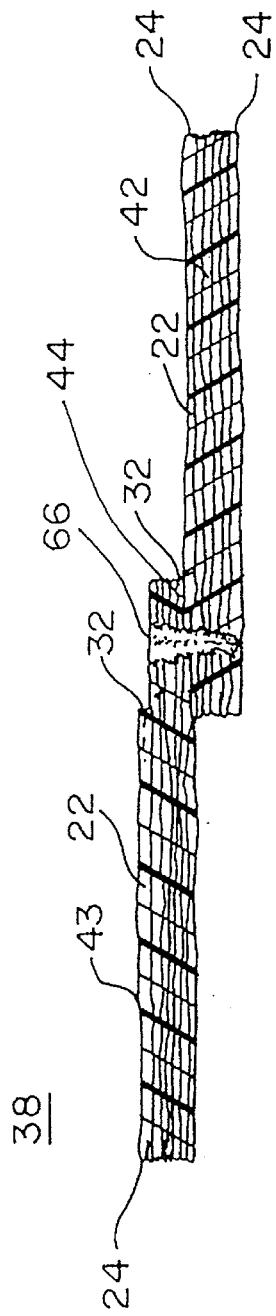

WICKETLESS SADDLE PACK OF PLASTIC BAGS

CROSS REFERENCE TO RELATED APPLICATIONS

This is a continuation-in-part of application Ser. No. 08/235,499, filed Apr. 29, 1994.

BACKGROUND OF THE INVENTION

1. Field of the Invention

This invention relates in general to plastic bag packs and, in particular, to a wicketless plastic bag pack and a method for making the pack. More specifically, but without restriction to the particular embodiment hereinafter described in accordance with the best mode of practice, this invention relates to a saddle pack of plastic bags that utilizes a minimum of disposable shipping materials and ultrasonic assembly of the wicketless plastic bag saddle pack.

2. Discussion of the Prior Art

The art of assembling bag packs employed in automated industrial bagging operations for packaging products like bread, or other consumer goods, typically involves bundling a stack of bags between two supporting boards with a disposable wicket secured by grommets.

The thermoplastic bags customarily used for packaging consumer products include a bottom edge which may be gussetted, top and bottom walls or front and back walls, depending on the orientation of the bag, a pair of side edges, and an open top end. The material forming the bottom or back wall has a lip portion extending beyond the open end of the bag. A perforated tear line may be formed between the open end of the bag and its lip portion. This tear line allows the bag to be removed from the lip portion as required during bagging operations. The lip portion is also provided with a pair of locating holes. As an alternative to the perforated tear line, top notches may be formed above the locating holes so that the bag may be torn through the notches during the bagging operation. In the assembly process of the bag pack, a U-shaped wicket is inserted through two corresponding locating holes in a first supporting board. As the thermoplastic bags issue off the production line, they are consecutively stacked upon the first support board with their respective locating holes placed over the extending prongs of the wicket. Once a desired number of thermoplastic bags is stacked upon the first board, a second supporting board with corresponding locating holes is placed over the wicket prongs to cover the top of the stack. Rubber grommets are moved down the wicket prongs to securely sandwich the stack of thermoplastic bags between the supporting boards. The bag pack is shipped in this condition to the industrial producer. Bagging equipment utilized by the industrial producer includes a wicket holder for positioning the stack of bags in relation to the production line. Pressurized air is employed to open the next consecutive bag on the pile so that product issuing off the production line is directed into the bag. The filled bag is then removed from the equipment wicket by tearing the bag from its lip portion along the perforated tear line or by tearing through the top notches above the locating holes. When the bagging equipment needs a resupply of bags, an equipment operator removes the rubber grommets and supporting boards from a new bag pack and places the new stack of bags on the wicket holder of the bagging equipment.

Use of this type of prior thermoplastic bag pack involves a waste of packing materials since the rubber grommets, supporting boards, and bag pack wickets are discarded when the stack of bags is mounted on the bagging equipment. In addition to this drawback, costly operator time is required in removing these materials from each bag stack. A further limitation relating to lost time is possible separation of the individual bags from the bag stack. Bagging machine downtime is caused by loose bags which can cause product to miss proper placement into a respective bag. This may result in an unwanted slow-down of the production line. Lastly, industrial producers encounter the cost of disposal in properly storing and hauling away the accumulation of these packing materials.

Another environment in which plastic bag packs are utilized is behind the deli counter or in the produce section of a grocery store. The plastic bags used in these situations are employed by the deli counter person to bag or wrap, for example, sliced meats, smoked fish, cheese, and other items commonly available from the deli. In the produce section, plastic bags are used by the consumer to individually bag, by item type, fruits and vegetables selected for purchase. Prior bag packs used behind the deli counter have included the prior art bag pack with disposable shipping materials discussed above. This type of bag pack and the well known roll of thermoplastic bags with twist-ties, have also been used in the produce section.

Recent developments in the thermoplastic bag pack art have lead to the advent of saddle packs of thermoplastic bags. The individual bags of the prior art saddle packs are formed from a continuous blown film tube of thermoplastic material. In some cases, the tube is extruded with zipper material. Once the tube is cooled, it is run through nip rollers to create a lay-flat tube for producing saddle bags. The cooled tube is cut into lateral sections to form a two-sheet saddle bag blank. The bottom edges of the bags are thereby formed by the folded edges of the flat tube. On one side of a two-sheet common lip area, the first sheet is slit from the tube segment and removed. The second sheet of the common lip area is perforated to provide a tear line between the open end of each bag and edge of the lip segment. This process forms a saddle bag configuration with a one-sheet common lip portion between the bags. The side edges are sealed together while the common lip is provided with a pair of locating holes. These individual saddle bags are then stacked in a pack. The saddle bag pack is typically suspended over a mounting bar with the pad of lips secured thereon by a wicket or stacking pins. Each of the two hanging bag packs of the saddle pack are thus simultaneously reachable by two customers in the produce section or two counter people behind the deli. While these saddle packs have proved valuable, particularly during peak hours when many consumers are shopping or counter people are rushing back and forth in an effort to quickly serve waiting customers, they are considerably more costly than conventional bag packs or rolls. In addition, the machinery required to produce the opposing bags from a blown tube of plastic material is expensive and not easily retooled to manufacture other products.

OBJECTS AND SUMMARY OF THE INVENTION

It is, therefore, an object of the present invention to improve thermoplastic bag packs, the individual bags thereof being employed to package consumer goods.

Another object of this invention is to improve the method for making a saddle pack of thermoplastic bags which individual bags are used for packaging consumer goods.

It is a further object of the present invention to minimize waste associated with using thermoplastic bag packs in consumer bagging environments.

Still another object of the present invention is to reduce the cost of assembling a saddle pack of thermoplastic bags by eliminating the need for packing materials required by the stack of bags.

It is yet a further object of the present invention to utilize thermoplastic bags produced on conventional manufacturing machinery to form a saddle pack of bags.

Yet another object of the present invention is to eliminate the possibility that individual bags in a pack of thermoplastic bags become separated from the pack prior to loading the bag pack on a mounting bar.

An additional object of the present invention is to utilize ultrasonic vibratory energy to weld together the respective lip portions of individual bags in a stack of thermoplastic bags to form an easily transported bag pack with a minimum amount of wasted packing material.

Still a further object of the present invention is to avoid the expense of dedicated machinery to form opposing plastic bags from a blown tube of thermoplastic material.

These and other objects are attained in accordance with the present invention wherein there is provided a wicketless saddle pack of thermoplastic bags. The present bag pack includes two stacks of individual thermoplastic bags. Each of the stacks are oppositely opposed to share a common welded pad of lips. Each of the bags in the stacks is consecutively arranged and has a bottom edge, upper and lower walls, a pair of side edges, and an open top end. In accordance with one aspect of the present invention, a lip segment is provided adjacent the open end of each individual bag. The lip portion is an extension of the material forming the lower wall of a respective bag and includes at least one locating hole. A perforated tear line is formed between the open end of the bag and the lip portion so that the bag may be easily removed from the lip. In accordance with the method of the present invention, the lip segments of the two opposed stacks of bags are bonded together in specific localized areas using ultrasonic energy to form the welded lip pad of the present saddle pack. At least one locating passageway is provided through the welded pad so that the bag pack is quickly and easily mounted on the stacking pins of a mounting bar. The passageway through the welded pad is formed through the thickness of the pad by virtue of the locating holes of consecutive lips being in register or by accurate location of the weld itself. According to another aspect of the method of the present invention, the welded pad is formed by moving at least two shaped ultrasonic horns downward through the stack of consecutive lips while simultaneously activating the shaped horns with ultrasonic vibratory energy to from a continuous tapered weld through the stack of consecutive lip portions.

BRIEF DESCRIPTION OF THE DRAWING

Further objects of the present invention together with additional features contributing thereto and advantages accruing therefrom will be apparent from the following description of a preferred embodiment of the invention which is shown in the accompanying drawing with like reference numerals indicating like components throughout, wherein:

FIG. 9 is an isolated plan view of a saddle pack of thermoplastic bags according to the present invention; and FIG. 10 is a sectional view of the saddle pack shown in FIG. 9 taken along section line 10—10.

DETAILED DESCRIPTION OF THE PREFERRED EMBODIMENT

Figure 1:
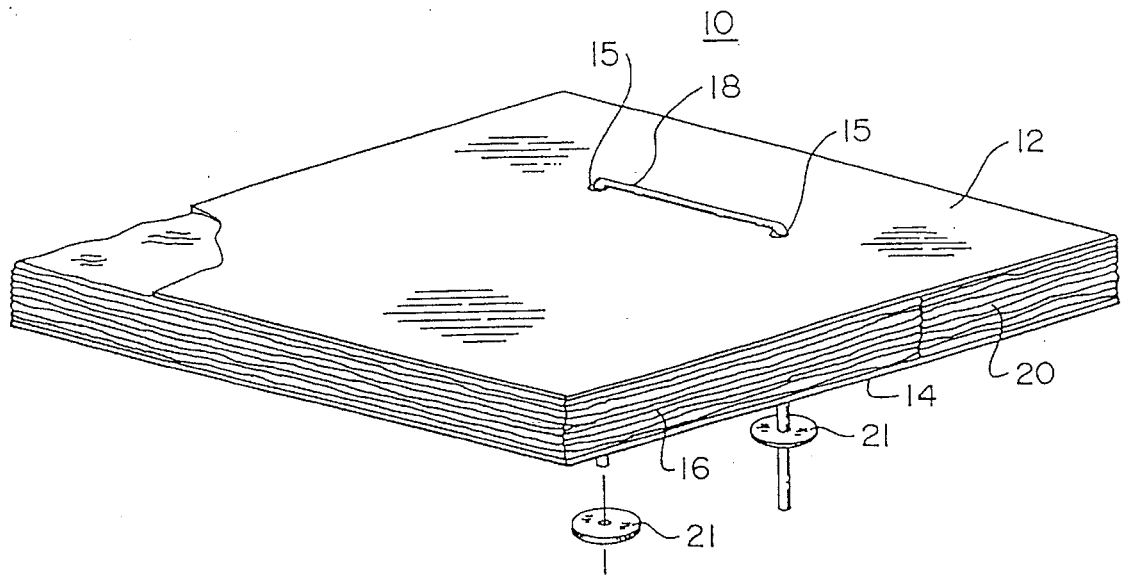
FIG. 1 is a perspective view of a pack of thermoplastic bags according to the prior art.

Referring now to FIG. 1, there is shown a prior art pack of thermoplastic bags generally referenced 10. The pack 10 includes a first supporting board 12 and a second supporting board 14. A pair of locating holes 15—15 are formed in the first board 12, while the second board 14 includes a similar pair of locating holes (not shown). The prior art pack 10 also includes a stack of thermoplastic bags 16 and a disposable wicket 18 which is inserted through the locating holes 15—15 and a stack of consecutive lip portions 20 in a known manner. The wicket 18 is then secured against the second board 14 by rubber grommets 21, which are moved over the wicket 18 to sandwich the stack of bags 16 and lip portions 20 between the two supporting boards 12 and 14.

Figure 2:
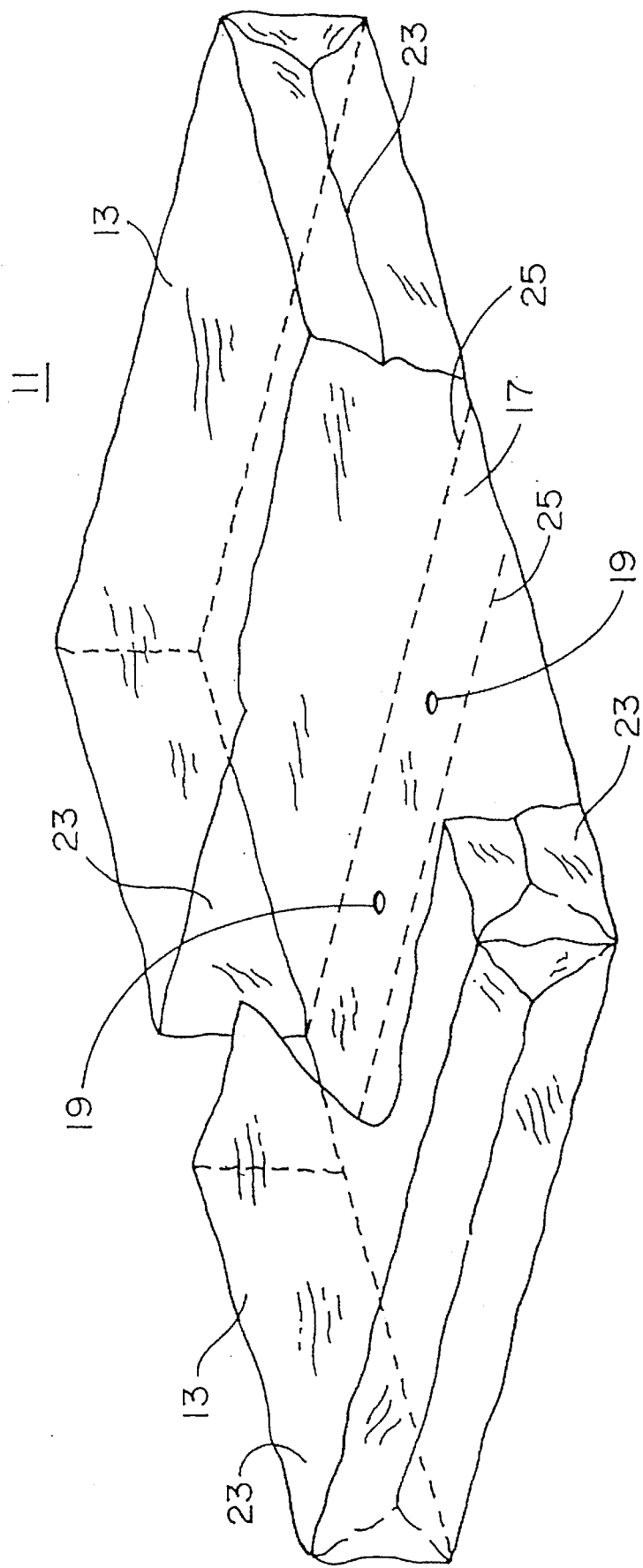
FIG. 2 is a perspective view of a pair of opposed thermoplastic bags utilized in prior art saddle bag packs.

FIG. 2 shows a prior art thermoplastic saddle bag 11 that includes a pair of oppositely opposed bags 13—13 connected to each other by a central or common single-sheet lip portion 17 that includes a pair of locating holes 19—19. The saddle bag 11 is employed in prior art saddle packs that include a stack of the saddle bags 11 positioned with the locating holes 19—19 of consecutive bags 11 in register. The saddle bag 11 is formed from a section of a blown tube of thermoplastic material. This section is cut and sealed in a manner known in the art to create the pair of bags 13—13 and the common single-sheet lip portion 17. Sides 23 of the bags 13 formed by a heat sealing process well known in the art. The saddle bag 11 also includes a perforated tear line 25 formed on each side of the common lip portion 17 so that the individual bags 13 bag may be removed from the lip portion and used for bagging purposes. The machinery required to manufacture the saddle bags 11, however, is complicated, expensive, and not easily retooled to manufacture related products. The saddle bags 11 may be assembled in a stack using the supporting boards 12 and 14, the disposable wicket 18, and the rubber grommets 21 described with reference to the bag pack 10 shown in FIG. 1.

Figure 3:
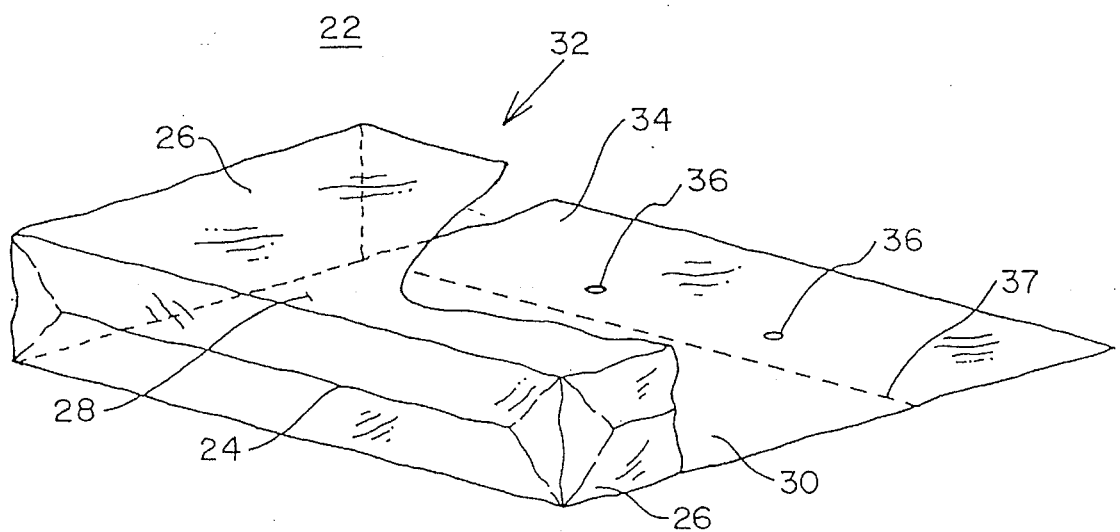
FIG. 3 is a perspective view a of an individual thermoplastic bag used in conjunction with the present invention.

With reference to FIG. 3, there is shown an individual thermoplastic bag generally referenced 22 which is used in conjunction with the present invention. The thermoplastic bag 22 includes a bottom edge 24, a pair of side edges 26—26, a front or upper wall 28, a back or lower wall 30, and an open top end 32. The thermoplastic bag 22 also includes a lip portion or segment 34 which includes a pair of locating holes 36—36. As can be seen in FIG. 2, the lip portion 34 is an extension of the thermoplastic material forming the bottom wall 30. A perforated tear line 37 is formed between the lip portion 34 and the open top end 32 of the bag 22 so that the bag may be easily removed from the lip portion.

Figure 4:
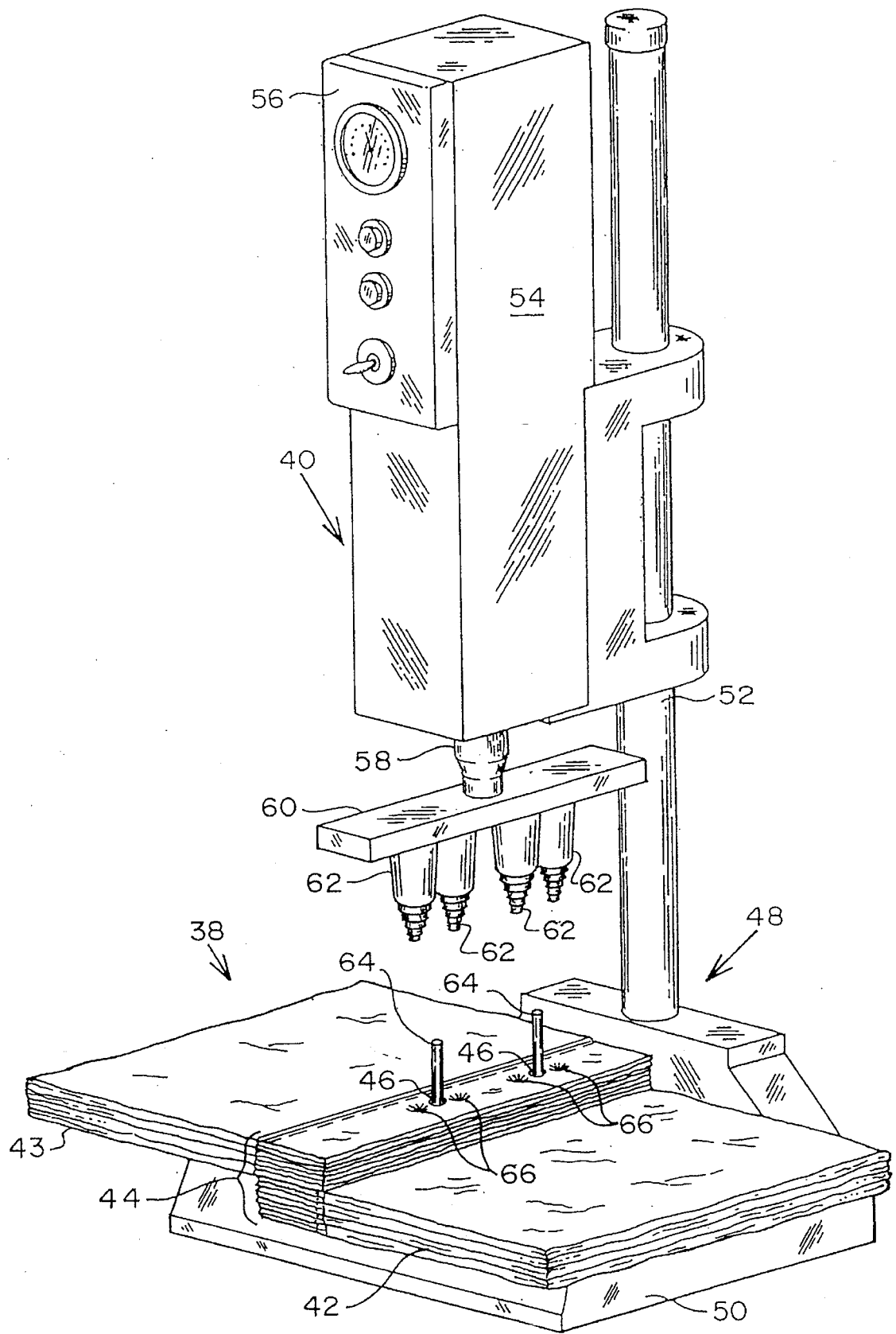
FIG. 4 is a perspective view of a saddle pack of thermoplastic bags according to the present invention shown in conjunction with an ultrasonic welding device as used in accordance with the method of this invention.

FIG. 4 shows a saddle pack of thermoplastic bags 38 according to the present invention in conjunction with an ultrasonic welding device 40, as used in accordance with the method of this invention. The saddle pack 38 includes a first stack 42 of a predetermined number of thermoplastic bags 22, a second stack 43 of a predetermined number of thermoplastic bags, 22 and a welded or bonded pad of lip segments 44. As shown in FIG. 4, the two bag stacks 42 and 43 are oppositely opposed to each other to form the saddle pack 38. In this manner, the individual bags 22 shown in FIG. 3, being manufactured on conventional equipment, are advantageously used to create the saddle pack 38. The pack 38 includes a pair of locating passages 46—46 formed through the welded pad 44. As would be apparent to one skilled in the art, the locating passageways 46—46 are formed by the locating holes 36—36 being in register with one another and by virtue of the thickness of the welded pad 44.

The ultrasonic welding device 40 includes a base assembly 48 having a support base 50 and a rigid support column 52. The welding device 40 also includes an ultrasonic actuator 54 having a control panel 56 which includes related control and display means. The ultrasonic actuator 54 is provided with a mounting adaptor or neck portion 58 which is adapted to receive a back driver 60 which is positioned substantially perpendicular to the support column 52. In accordance with one aspect of the present invention, the back driver 60 of the ultrasonic actuator 54 includes shaped ultrasonic horns 62. The driver 60 and the horns 62 together form the horn assembly for the welding device 40. A reusable wicket 64 is temporarily provided to properly align and locate the stacks of thermoplastic bags 42 and 43 relative to the shaped ultrasonic horns 62. The welded pad 44 of lip segments 34 is bonded together by tapered or cone-shaped ultrasonic welds 66 which will be described in further detail below.

Figure 5:
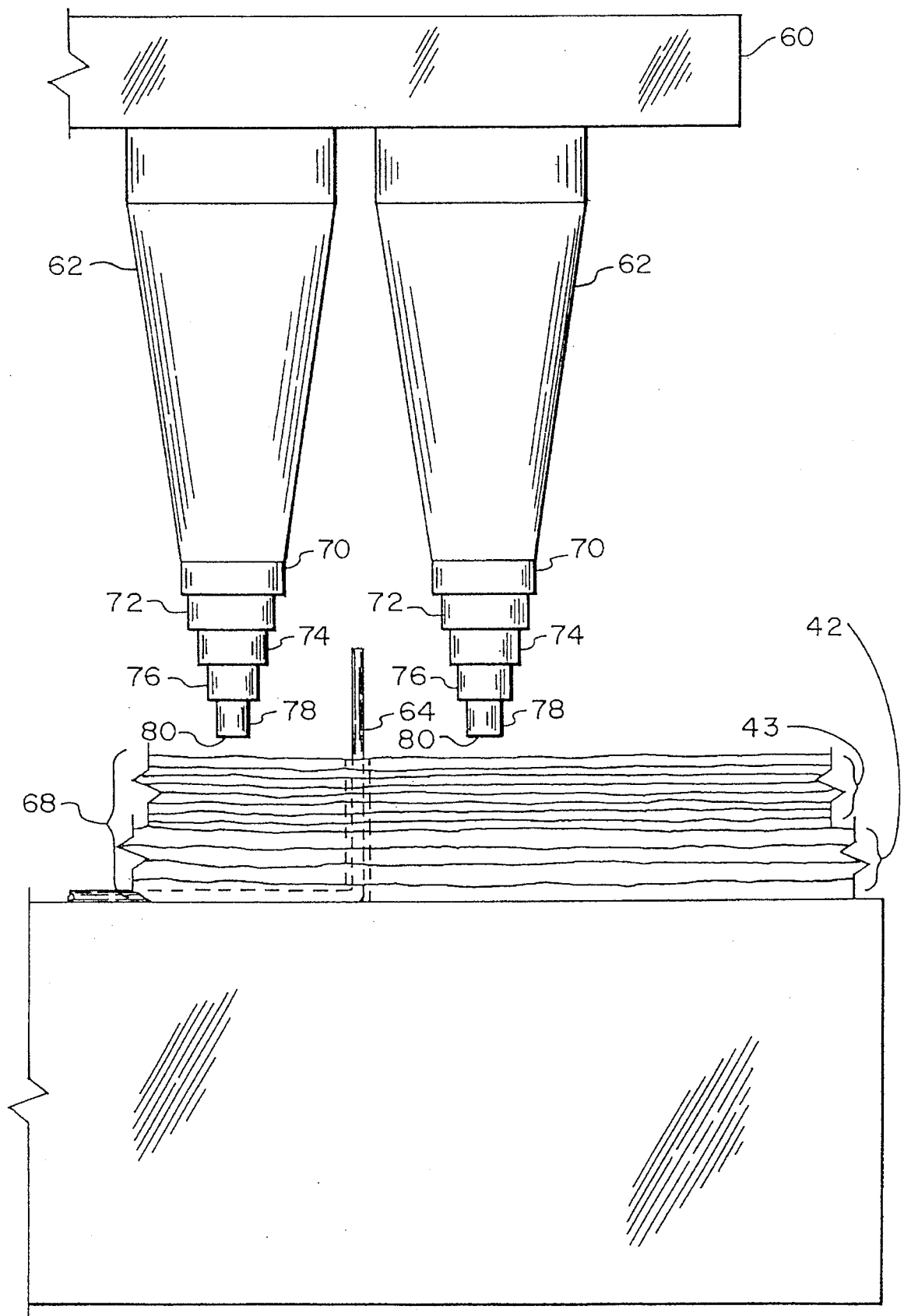
FIG. 5 is an isolated front elevation view of the saddle bag pack and welding device of FIG. 4.
Figure 6:
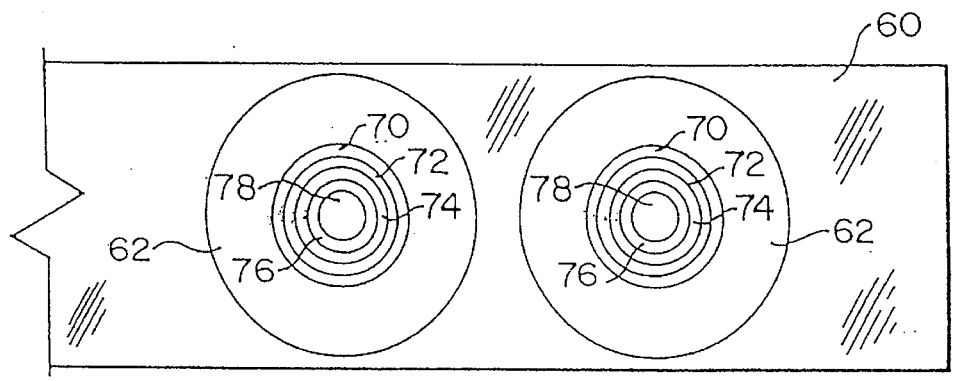
FIG. 6 is a partial plan view of the shaped ultrasonic horns used in accordance with the present method for making the wicketless saddle pack of plastic bags according to this invention.

Prior to forming the saddle pack of thermoplastic bags 38, a loose double stack of lip segments 68 is secured by the reusable wicket 64 and positioned on the base 50 of the ultrasonic welding device 40 as shown in FIG. 5. The loose double stack of lip segments 68 is formed by the number of individual lip segments 34 from the first and second bag stacks 42 and 43. As illustrated in FIGS. 4 and 5, the first stack of bags 42 in placed over the reusable wicket 64 with one particular orientation. Thereafter, the second stack of bags 43 is placed over the wicket 64 with an orientation that is oppositely opposed to the first stack 42. As shown in further detail in FIGS. 5 and 6, the shaped ultrasonic horns 62 each preferably include a first concentric ring 70, a second concentric ring 72, a third concentric ring 74, a fourth concentric ring 76, and a fifth concentric ring 78. Each horn 62 also includes a tip portion 80 which is coincident with the distal end of the fifth concentric ring 78.

Figure 7:
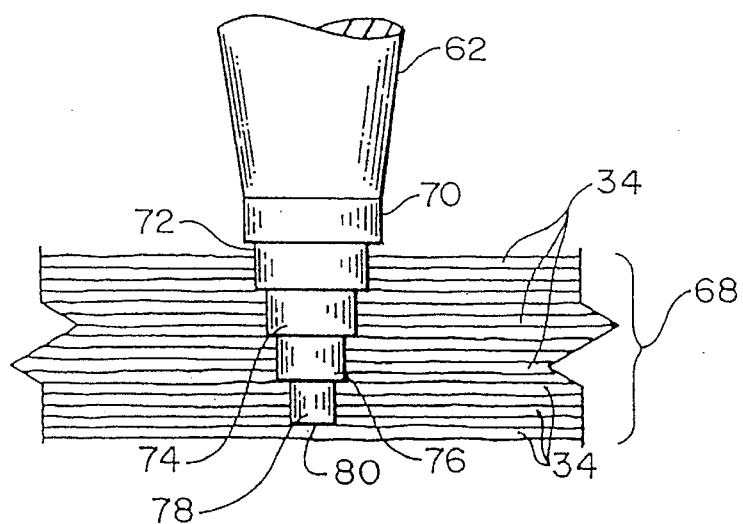
FIG. 7 is a detailed partial cross sectional view of one of the shaped ultrasonic horns of FIG. 5 shown driven into a stack of thermoplastic bag lips in accordance with the method of the present invention.
Figure 8:
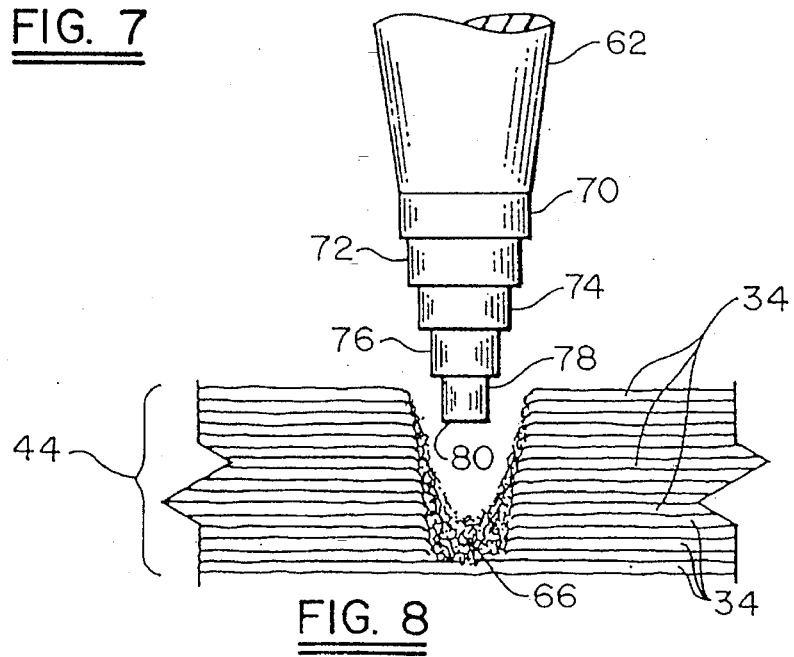
FIG. 8 is a view similar to FIG. 7 showing the shaped ultrasonic horn removed from the stack of lips after forming a weld therein.

Referring now to FIGS. 7 and 8, the method according to the present invention will be described in detail with reference to forming the saddle pack of thermoplastic bags 38. FIG. 7 shows the shaped ultrasonic horn 62 as driven into the loose double stack of lip segments 68. As can be seen in FIG. 7, the concentric rings 70, 72, 74, 76, and 78 move through the thermoplastic of the stack 68 until the tip 80 of the ultrasonic horn 62 is in intimate contact with the last lip segment 34 in the stack 68. While the ultrasonic horn 62 is being moved into the position shown in FIG. 7, the ultrasonic actuator 54 is actuated with ultrasonic vibratory energy. After a predetermined cycle of ultrasonic energy, the shaped ultrasonic horn 62 is removed from the double stack of lip segments, which has been transformed to the welded pad of lip segments 44 as shown in FIG. 8. After the welded lip pad 44 is formed, the reusable wicket 64 is removed from the saddle pack 38 and saved for later use in welding other bag packs. As shown in further detail in FIG. 8, the cone-shaped ultrasonic weld 66, by virtue of the shape of the concentric horn rings, forms a bond or weld through the stack 44 so that the individual lip segments 34 are consecutively bonded to each other throughout the pad 44. The placement of the welds 66 is preferably adjacent each of the locating passageways 46 so that the corresponding locating holes 36 are maintained in register with each other. In this manner, the locating passageways 46 remain semi-rigid so that the bag pack 38 may be quickly and accurately mounted on the wicket holder or mounting bar of the related bagging equipment while the bags 22 are prevented from falling loose prior to mounting. In the preferred embodiment of this invention, the ultrasonic welding device 40 is provided with four horns 62 while the pad 44 includes two locating passageways 46 which are positioned to accommodate a standard wicket spacing. The four horns 62 are positioned on the back driver 60 in such a manner as to place a pair of welds 66 adjacent each locating passageway 46.

FIGS. 9 and 10 show the saddle pack 38 after the above-described ultrasonic welding operation. As best illustrated in FIG. 10, the welds 66 bond consecutive lips of the opposed stacks 42 and 43, which in turn bond the two stacks to each other to form the saddle pack 38. In alternate embodiments of the saddle pack 38, the bottom edge 24 or the top end 32 of each of the bags 22 may be provided with a reclosable plastic zipper of a type well known in the art.

There has thus been shown and described a useful and novel wicketless plastic saddle bag pack and method for making the pack in such a manner that reduces waste materials and installation time associated with employing the bag pack in industrial bagging equipment or on support stands placed in consumer shopping areas.

While this invention has been described in detail with reference to a certain preferred embodiment, it should be appreciated that the present invention is not limited to that precise embodiment. Rather, in view of the present disclosure which describes the best mode for practicing the invention, many modifications and variations would present themselves to those of skill in the art without departing from the scope and spirit of this invention, as defined in the following claims.

What is claimed is:

1. A wicketless saddle pack of thermoplastic bags comprising:

a first stack of a plurality of individual thermoplastic bags, each bag thereof being consecutively arranged in the stack and having a bottom edge, upper and lower walls, a pair of side edges, and an open top end;

a second stack of a plurality of individual thermoplastic bags, each bag thereof being consecutively arranged in the stack and having a bottom edge, upper and lower walls, a pair of side edges, and an open top end;

a lip segment formed adjacent the open end of each individual bag, said lip segment being an extension of the lower wall of a respective bag, each bag being removable from its respective lip segment along a perforated tear line formed between the open end of the bag and the lip segment, the consecutive lip segments defined by the first stack positioned atop the consecutive lip segments defined by the second stack of bags so that the bags in the first stack are oppositely opposed to those in the second stack;

a pad being formed by said consecutive lip segments of both the first and second stack of bags, said pad being bonded together with ultrasonic vibratory energy from a shaped ultrasonic horn; and at least one locating passageway formed through the bonded pad, said at least one passageway for suspending the two bag stacks over a mounting bar so that an individual bag from either stack is removable from the bonded pad by tearing the bag therefrom along its respective perforated tear line.

2. The wicketless saddle pack of thermoplastic bags according to claim 1 including two locating passageways formed through the bonded pad of lip segments.

3. A wicketless saddle pack of thermoplastic bags comprising:

a first stack of thermoplastic bags, each bag thereof being consecutively arranged in the stack and having a bottom edge, upper and lower walls, a pair of side edges, and an open top end;

a second stack of thermoplastic bags, each thereof bag being consecutively arranged in the stack and having a bottom edge, upper and lower walls, a pair of side edges, and an open top end;

a lip segment formed adjacent the open end of each individual bag, said lip segment being an extension of the lower wall of a respective bag, each bag being removable from its respective lip segment along a perforated tear line formed between the open end of the bag and the lip segment, the consecutive lip segments defined by the first stack positioned atop the consecutive lip segments defined by the second stack of bags so that the bags in the first stack are oppositely opposed to those in the second stack;

a pad formed from the stacked lip segments of said first and second bag stacks, said pad bonded together by at least one continuous tapered weld through the pad; and at least one locating passageway formed through the bonded pad being positioned adjacent said at least one continuous tapered weld so that each hole forming a passageway is retained in register to maintain the form of the passageway for suspending the stack of bags over a mounting bar so that an individual bag from either stack is separately usable for bagging purposes;

the bonded pad of being formed by moving at least one shaped ultrasonic horn downward through the pad while simultaneously activating the shaped horn with ultrasonic vibratory energy to form each continuous tapered weld positioned adjacent each passageway.

4. The wicketless saddle pack of thermoplastic bags according to claim 3 including two locating passageways formed through the bonded pad of lip segments.

5. The wicketless saddle pack of thermoplastic bags according to claim 4 wherein the bonded pad is formed by simultaneously moving two separate shaped ultrasonic horns adjacent each of the two passageways formed in the stack of consecutive lip segments.

* * * * *